May 6, 1969 H. S. HOFFMAN, JR., ET AL 3,443,195
DC-TO-DC CONVERTER WITH CONTINUOUS FEED TO THE LOAD
Filed Sept. 14, 1967
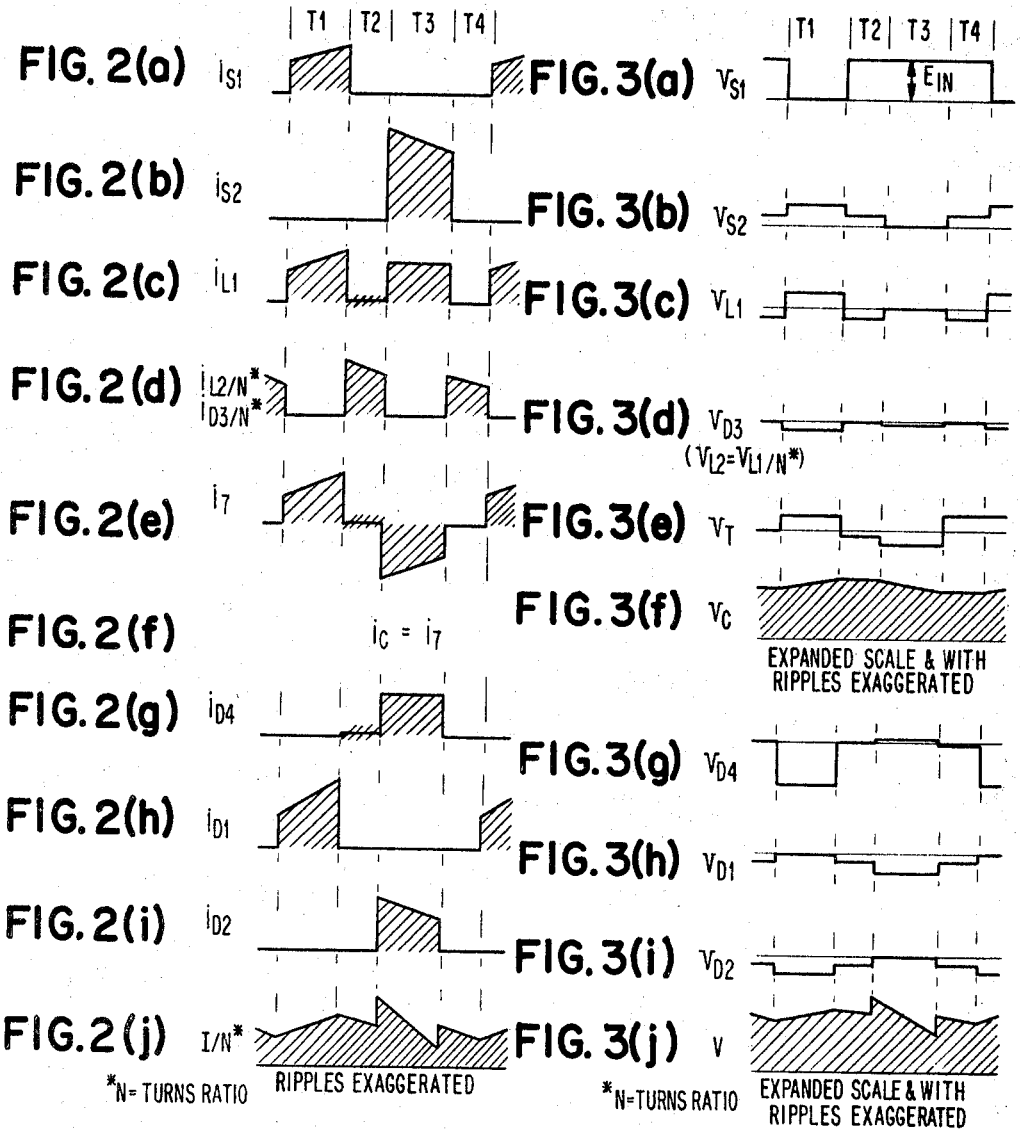
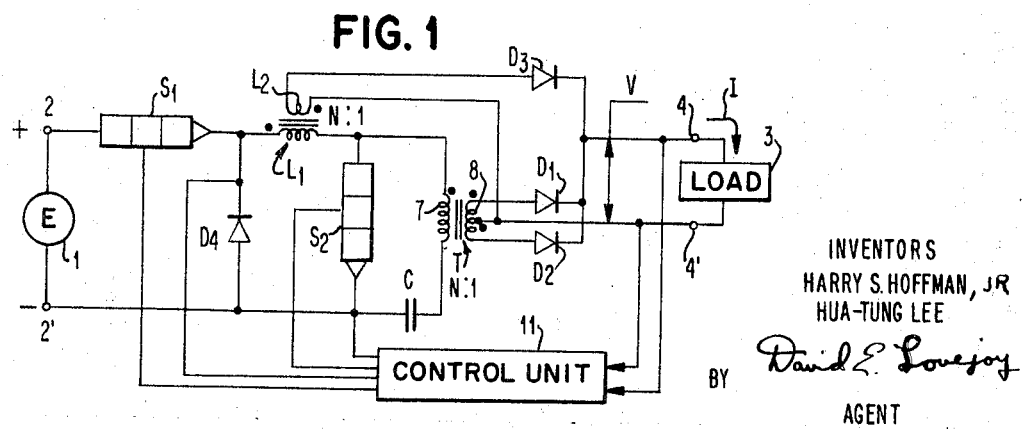
INVENTORS
HARRY S. HOFFMAN, JR
HUA-TUNG LEE
BY David E. Lovejoy
AGENT United States Patent Office 3,443,195
Patented May 6, 1969

3,443,195
DC-TO-DC CONVERTER WITH CONTINUOUS FEED TO THE LOAD
Harry S. Hoffman, Jr., Saugerties, and Hua-Tung Lee, Ashokan, N.Y., assignors to International Business Machines Corporation, Armonk, N.Y., a corporation of New York
Filed Sept. 14, 1967, Ser. No. 667,762
Int. Cl. H02m 3/02
U.S. Cl. 321—2                              7 Claims

ABSTRACT OF THE DISCLOSURE

Disclosed is a DC-to-DC converter circuit which has a regulated output voltage to protect against source and load variations. The regulation is achieved by controlling the "ON" and "OFF" time of the power source. The converter features the "ORING" of primary power to the load. The "ORING" of power to the load is achieved through a primary storage inductor which stores energy while power is being delivered through it from a source, through a transformer, and rectifier to a load and which supplies its stored energy to the load through an isolated winding when the power source is not delivering power to the load.

CROSS-REFERENCES TO RELATED APPLICATIONS

"Improved DC-to-DC Converter With Continuous Feed to the Load," Inventor: John R. Cielo, (Ser. No. 667,698 filed simultaneously with this application).

"Storage Mode Inverter Circuit," Inventor: J. Saia; Ser. No. 586,775; Filed: Oct. 14, 1966; note therein particularly FIG. 12 and its description.

BACKGROUND OF THE INVENTION

Many modern day electronic machines require a regulated DC voltage for their operation. Often, the generation of such a DC voltage is achieved by converting a 290 volt DC (rectified 208 volt, 3φAC) level down to a lower level such as 3 volts DC. Of course, this example is just one of the many that are required in today's machines. Typical DC/DC converters for achieving such conversions contain five elements, namely, an inverter, a transformer, a rectifier, a DC filter, and a control section.

The inverter, including a switching transistor or other source switch, serves to convert the input DC source voltage to a rectangular AC waveform which is in turn passed through a transformer to the secondary, rectified and filtered to obtain a DC output voltage.

In more detail, conventional converters have included a DC power source which is alternately connected and disconnected, through a source switch (e.g. transistor), to the primary windings of a transformer. When the source switch is on, the transformer directly couples power from the power source to the secondary where it is rectified, filtered and delivered to the load. Current reversing means are also provided to reverse the direction of current in the primary winding of the transformer. The current reversing means include a current-reversing switch (e.g. transistor) which is turned on during periods when the power source switch is turned off. Reversal of the current in the primary winding still delivers power to the load since the transformer secondary generally includes a split secondary winding (a center tapped winding) with each outer leg including a rectifying diode each feeding the load through the same load terminal and through the same filter.

The control portion of the system senses the output voltage and acts to control by turning the source switch and the current-reversing switch on and off, the ratio of the "ON" to "OFF" time of the source voltage thereby controlling the output voltage level.

Those typical prior art converters have presented a number of problems since most conventional systems have been designed with a low primary impedance. With this low primary impedance, the failure of a component such as a shorted rectifier, saturated transformer, or shorted winding causes the primary current to increase so rapidly that the primary switching transistors are destroyed. Since those transistors are usually expensive their destruction, of course, should be avoided if possible.

Many conventional DC-to-DC converters have also exhibited excessive ripple in the output voltage, V, particularly when the input voltage, E, has been greatly stepped down, that is, when the ratio $E/V$ is large.

In view of the above problems, it is an object of the present invention to provide an improved voltage converter which exhibits improved output voltage regulation, increased smoothness of operation and greater fault protection. These and other objects and advantages attendant the present invention are apparent from the summary and other descriptions which follow.

SUMMARY OF THE INVENTION

The improvement of the present invention includes the insertion of a storage inductor in the primary circuit of conventional DC-to-DC converters between the power source and the transformer primary winding. The storage inductor stores energy when the power source switch is on and delivers that energy, under the control of control means, through coupling means (e.g. a winding) independently coupling the storage inductor to the load. The inductor functions independently from the main transformer. In accord with this independence, power is "OR'ed" to the load, that is, it is supplied to the load through the same load terminal which also conducts current from various other reservoirs.

The inclusion of the storage inductor in the primary circuit provides a large impedance which prevents a rapid rise in primary current in the event that a failure occurs in one or more of the primary components. Moreover, the sequential delivery of power to the load from the various power reservoirs (that is, the power source, the storage inductor, and other power reservoirs mentioned hereinafter) is achieved in a smooth manner without the generation of excessive transients.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 1 depicts a circuit employing a primary inductor L1 for storing and transferring power to the load in accordance with the present invention.

FIGS. 2(a) to 2(j) depict various current waveforms characteristic of the operation of the FIG. 1 circuit.

FIGS. 3(a) to 3(j) depict various voltage waveforms characteristic of the operation of the FIG. 1 circuit and corresponding to the current waveforms of FIG. 2.

DETAILED DESCRIPTION

As previously pointed out, the purpose of the circuit of this invention is to convert an input DC voltage to a well-regulated DC output voltage employing, but significantly improving upon, well known DC-to-DC converter techniques. It will, of course, be realized that an AC signal can be easily rectified to provide the type of unregulated DC input usually associated with DC-to-DC converters. Accordingly, this invention contemplates AC-to-DC conversion although the significant contribution of this invention is in the DC-to-DC portion of such an AC-to-DC converter.

With reference to FIG. 1, the input voltage, E, to be regulated and stepped down is supplied, by power source 1, to the input terminals 2–2′ and the well-regulated DC output, V, appears across the load 3 at output terminals 4–4′. The components designated in FIG. 1 are those conventionally found in the DC-to-DC converter technology and accordingly, no further description of them at this point is deemed necessary. Additionally, the interconnections of the various components will also be given in connection with a description of the circuit operation.

The operation of the FIG. 1 DC-to-DC converter is conveniently described with reference to four time periods. Those four time periods, T1, T2, T3, and T4, correspond to the sequential opening and closing times of the switches S1 and S2. Those time periods are shown throughout the waveforms of FIGURES 2 and 3. FIGURES 2(a) through 2(j) depict various currents passing through various components of the FIG. 1 circuit, those components being indicated by the appropriate component subscript (such as S1, L1, etc.), for the different time periods T1 through T4. For example, during the period T1, the current through the source switch S1 is given by $i_{s1}$ as shown in FIG. 2(a). Similarly, the current $i_{s2}$ is shown in FIG. 2(b) and which, as shown, is conducting only during the period T3.

Corresponding to the current waveforms shown in FIGURE 2 are the voltage waveforms shown in FIGURE 3. The voltage waveforms like the current waveforms are shown for the time periods T1 through T4 and they designate the voltage across the component indicated by the subscript.

In FIG. 1, switches S1 and S2 are shown as transistors but, of course, other well-known equivalents can be employed. Switch S1 is designated as a source switch since it functions to connect the power source 1, through a storage inductor L1, to the primary winding 7 of the transformer T. The switch S2 is designated a current-reversing switch and is part of a current-reversing means since, when it is conducting, it functions to allow the current to be reversed in the primary winding 7 of transformer T.

OPERATION

The first period of operation, T1, begins when switch S1 is turned on (conducting) while switch S2 remains off (non-conducting). Under those conditions, the source voltage E is impressed across the simple series circuit composed of the storage inductor L1, the primary winding 7 of transformer T, and the storage capacitor C. As indicated by the dot convention, the current in the primary winding 7 induces a voltage in the secondary winding 8 having a polarity which causes rectifying diode D1 to conduct a current to the load 3. With diode D1 conducting, the other rectifying diode, D2, is reverse biased and therefore non-conducting. In a similar manner, the coupling winding L2, associated with the storage inductor L1 in the manner indicated by the dot convention, reverse biases the coupling diode D3. With D3 reverse biased, the secondary L2 of storage inductor L1 is essentially open-circuited and therefore L1 acts merely as an inductor. Accordingly, during the T1 period, the storage inductor L1 as well as the storage capacitor C are storing energy which will be transferred to the load at a subsequent time. Simultaneously with this storage into the L1 and C reservoirs, the transformer T is delivering power through the forward biased diode D1 to the load 3. Besides the beneficial effect of storing energy for subsequent use, L1 and C also serve to reduce the voltage drop across the primary winding 7 because of the voltage-splitting, series relationship of L1, the primary of T, and C. As pointed out above, when a large reduction in the input voltage is desired at the output (that is, the ratio E/V is large), the voltage reduction contributed by the voltage drops across L1, and C significantly aids the over-all reduction from E to V. It should be noted that this voltage reduction contributed by the "storing" drops across L1, and C is non-dissipative in that the energy stored is subsequently used. Since it is non-dissipative, no problems such as undesirable heat generation are created. Also, since a large E/V ratio will often be a limiting characteristic in a practical converter circuit design, the stated voltage drops are a significant contribution to the present invention.

In FIGURE 2(a) the current through the source switch S1 is seen to exhibit a nearly linear rising slope. The nearly linear slopes for $i_{s1}$ and all other currents result from the fact that the appropriate time constants are considerably larger than the corresponding phase durations and, hence, all of the waveforms may be considered as having linear time function segments as is apparent throughout the waveforms in FIG. 2. The basic operating frequency (that is, $1/[T1+T2+T3+T4]$) generally ranges from 30 to 100 kHz. depending upon the switching speeds of the transistors and rectifier diodes. There is no theoretical limitation, however, as to the frequencies at which the circuit may be operated.

The second period of operation, T2, begins when the control unit 11 turns the source switch S1 off (switch S2 still remaining off). With both S1 and S2 off, and with the storage inductor L1 and the storage capacitor C having energy stored therein, both L1 and C attempt to discharge their energy. Since there is no discharge current path through C with S1 and S2 non-conducting (because diode D4 conducts only in the direction opposite to the discharge direction of C) C cannot discharge. The energy stored in the L1 reservoir may be discharged, however, through the coupling winding L2 and diode D3 since the polarity during T2 across the L2 winding is such as to cause conduction through D3 to the load 3. The storage inductor L1 and its coupling coil L2 still only act as an inductor during the T2 period although the current is now through the coupling coil L2 rather than through the primary coil L1. The transfer of the energy from the storage inductor L1 through the coupling diode D3 back-biases the rectifying diodes D1 and D2 except under low output voltage conditions where the voltage developed across winding 7 may be sufficient to drive a small current through D2.

It should be noted that, during T2, the magnetizing current stored in winding 7 develops a potential tending to cause a current to free wheel through the series circuit C, D4, L1, and winding 7. This current is small as depicted in FIGS. 2(c), 2(e), and 2(g) indicating the currents $I_{L1}$, $I_7$, and $I_{D4}$, respectively. The explanation for the small free-wheeling current is understood by recalling that a current through an inductive device cannot change instantaneously. During T1, therefore, current through L1 and winding 7 cannot be terminated instantaneously when T2 commences by the switching to non-conduction of S1. The current in L1 accordingly finds a path in the L2–D3 coupling means and is crossed over thereto. The magnetizing current in winding 7, however, only finds a path through D4. If the path through D4 were not available, a large voltage transient would be developed across winding 7 which would adversely affect the desired smooth output voltage.

The third period, T3, begins when control unit 11 turns on the current reversing switch S2 (S1 remaining off) which allows the storage capacitor C to deliver its energy to the load through the transformer primary winding 7 (completing its return to C through switch S2) coupled to the secondary winding 8 and diode D2. Since switch S2 is nearly a short circuit across the storage inductor L1 and the diode D4, a large current will circulate in the D4–L1–S2 loop in a free-wheeling manner, diode D3 being cut off by the operation of the current through the diode D2 to the load.

The final period, T4, is analogous to the second period and it commences when the control unit 11 turns off switch S2 (S1 remaining off). Under these conditions, as during T2, the energy in the storage inductor L1 continues to supply the load through the coupling coil L2 and the coupling diode D3 while the energy in the storage capacitor C is conserved. The current in the T–C–D4 loop is essentially zero during the fourth period since the reverse current through the winding during the third period reduced the magnetizing current in the transformer to zero or slightly negative. At the end of the fourth period, the source switch S1 is again rendered conducting to allow conduction from the source and the T1–T4 cycles are repeated in the manner above described.

The output voltage is controlled in the usual manner, that is, the duration of conduction of the power source 1 under the control of switches S1 and S2, which are in turn controlled by control unit 11, governs the output voltage. More specifically, the ratio of the period T1 to [T2+T3+T4] determines the ultimate output voltage. While complicated conventional control units are well known for use with the present invention, it should be noted that the present invention does not require that those well known control units be used. Alternatively, the present invention may employ a simple "limit switch" unit. Such a limit switch unit would merely function to maintain the circuit in the T1 condition until an upper output voltage limit is reached, the T1 period beginning after detection that the output voltage had dropped below a lower limit. The T1, T2, T3, and T4 cycle would be completed, of course, in the manner previously described. The implementation of a simple logic circuit to carry out the limit switch control would be apparent to any engineer of ordinary skill in the art and, accordingly, no further details are presented herein.

Since it is desirable that the current to the load remain as uniform as possible, the turns ratio, N, in a preferred embodiment for the inductor primary to secondary will be made equal to the turns ratio for the transformer primary to half-secondary. With that configuration, the current which crosses over from the primary inductor L1 through the coupling loop L2–D3 to the load will be essentially the same as the current which was being supplied to the load through the transformer. Other embodiments and details of DC-to-DC converters are described in the applications above referenced in the section CROSS-REFERENCES TO RELATED APPLICATIONS, and the description of those embodiments are hereby incorporated by reference in this specification.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a voltage converter having a source switch, connected between a power source and a transformer primary winding, for gating under control of a control unit current in one direction through the transformer primary winding; current reversing means, including a current reversing switch controlled by the control unit, for reversing the direction of current through the transformer primary winding; and rectifying diodes connected respectively from the legs of the transformer split secondary windings to a load terminal, the improvement comprising:
  a storage reservoir, connected between the source switch and the transformer primary winding, to store energy during conduction of the power source, and
  coupling means, connecting said reservoir to said load terminal, to supply energy from said reservoir through said load terminal during periods when the power source is not conducting.

2. The improved voltage converter of claim 1 wherein said storage reservoir is an inductor having an inductor primary winding connected between the source switch and the transformer primary winding, and wherein said coupling means includes an inductor secondary winding magnetically coupled to said inductor primary winding.

3. The improved voltage converter of claim 2 wherein said coupling means further includes a diode connecting said inductor secondary winding to said load terminal.

4. The improved converter of claim 2 wherein the voltage turns ratio from the inductor primary to secondary is substantially the same as the turns ratio from the transformer primary to half-secondary.

5. A voltage converter for converting an input DC signal to a well regulated output DC signal comprising:
  (a) a primary series circuit including,
    a transistor for gating the input DC signal to said series circuit,
    an inductor primary winding,
    a transformer primary winding, and
    a storage capacitor;
  (b) a current reversing circuit including,
    a current-reversing transistor shunted across said transformer primary winding and capacitor so as to conduct current in the discharge direction through said capacitor via said transformer primary winding, and
    a diode shunted across said inductor primary winding, transformer primary winding, and capacitor so as to conduct current through said inductor primary winding and said current-reversing transistor;
  (c) a transformer secondary including,
    a split secondary winding, and
    rectifying diodes feeding a common load terminal;
  (d) coupling means including,
    an inductor secondary winding magnetically coupled to said inductor primary winding, and
    a coupling diode connected to deliver current from said inductor secondary winding to said load terminal;
  (e) a control unit for sensing the DC output signal and controlling the "ON/OFF" time of said transistors as a function of the DC output voltage.

6. The voltage converter of claim 5 wherein the turns ratio of said inductor primary to secondary substantially equals the turns ratio of said transformer primary to half-secondary.

7. The voltage converter of claim 5 wherin said control unit is a limit switch control unit operative to gate "ON" the input DC signal until the output DC signal exceeds an upper limit and commencing after the output DC signal drops below a lower limit.

References Cited

UNITED STATES PATENTS

| | | | |
|---|---|---|---|
| 1,593,357 | 7/1962 | Prince | 321—2 |
| 3,164,767 | 1/1965 | Morgan | 321—45 X |
| 3,303,405 | 2/1967 | Schwarz | 321—2 |
| 3,389,322 | 6/1968 | Smeltzer | 321—2 X |

JOHN F. COUCH, *Primary Examiner.*

W. H. BEHA, JR., *Assistant Examiner.*

U.S. Cl. X.R.

321—18